United States Patent
Nicholson

(10) Patent No.: US 8,600,454 B2
(45) Date of Patent: *Dec. 3, 2013

(54) DECISIONS ON AMBIENT NOISE SUPPRESSION IN A MOBILE COMMUNICATIONS HANDSET DEVICE

(71) Applicant: Apple Inc., Cupertino, CA (US)

(72) Inventor: Guy C. Nicholson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,267

(22) Filed: Nov. 9, 2012

(65) Prior Publication Data

US 2013/0065652 A1 Mar. 14, 2013

Related U.S. Application Data

(63) Continuation of application No. 12/874,888, filed on Sep. 2, 2010, now Pat. No. 8,320,974.

(51) Int. Cl.
*H04B 1/38* (2006.01)
*H04K 3/00* (2006.01)

(52) U.S. Cl.
USPC .......................................... 455/570; 381/71.1

(58) Field of Classification Search
USPC .................................. 455/570; 381/71.1, 94.1
See application file for complete search history.

(56) References Cited

U.S. PATENT DOCUMENTS

| | | | |
|---|---|---|---|
| 3,644,674 A | 2/1972 | Mitchell et al. | |
| 5,920,834 A | 7/1999 | Sih et al. | |
| 6,952,672 B2 | 10/2005 | Smith | |
| 8,320,974 B2* | 11/2012 | Nicholson | 455/570 |
| 2007/0136052 A1 | 6/2007 | Gao et al. | |
| 2007/0230712 A1 | 10/2007 | Belt et al. | |
| 2008/0260175 A1 | 10/2008 | Elko | |
| 2010/0081487 A1 | 4/2010 | Chen et al. | |
| 2010/0131749 A1 | 5/2010 | Kim et al. | |
| 2012/0058803 A1 | 3/2012 | Nicholson | |

FOREIGN PATENT DOCUMENTS

GB 2234881 2/1991

OTHER PUBLICATIONS

Non-Final Office Action (dated Feb. 27, 2012), U.S. Appl. No. 12/874,888, filed Sep. 2, 2010, First Named Inventor: Guy C. Nicholson, 10 pages.

Goldin, Alexander A., "Close Talking Autodirective Dual Microphone", AES 116th Convention Paper, Berlin, Germany, (May 8-11, 2004), 5 pages.

(Continued)

*Primary Examiner* — Lee Nguyen
(74) *Attorney, Agent, or Firm* — Blakely, Sokoloff, Taylor & Zafman LLP

(57) ABSTRACT

A method in a communications device includes the following operations. During a call, a process automatically detects that the device has moved from an at-the-ear position to an away-from-the-ear position. Based on the detection, a noise suppressor that operates upon an uplink signal for the call is signaled to change its noise suppression performance. Other embodiments are also described and claimed.

17 Claims, 4 Drawing Sheets

(56) References Cited

OTHER PUBLICATIONS

National Semiconductor Corp., "Uplink Far Field Noise Suppression & Downlink SNR Enhancing Microphone Amplifier with Earpiece Driver", LMV1099 Product Brief, www.national.com, (Jul. 20, 2010), 2 pages.

Purdy, J. G., "Noise Suppression in Wireless Handsets", Frost & Sullivan Market Insight, retrieved from Internet, (Jun. 6, 2009), 2 pages.

Roos, Gina, "Agilent's new proximity sensor beats the fumble-fingered competition hands down . . . literally", EE Times Product Brief, (Sep. 2004), 1 page.

\* cited by examiner

DECISIONS ON AMBIENT NOISE SUPPRESSION IN A MOBILE COMMUNICATIONS HANDSET DEVICE

RELATED MATTERS

This application is a continuation of U.S. patent application Ser. No. 12/874,888, filed Sep. 2, 2010, entitled "Decisions on Ambient Noise Suppression in a Mobile Communications Handset Device", currently pending.

An embodiment of the invention is related to techniques for enabling and disabling an ambient noise suppressor of a mobile communications handset device. Other embodiments are also described.

BACKGROUND

Mobile phones enable their users to conduct conversations in many different acoustic environments. Some of these are relatively quiet while others are quite noisy. There may be high background or ambient noise levels, for instance, on a busy street or near an airport or train station. To improve intelligibility of the speech of the near-end user as heard by the far-end user, an audio signal processing technique known as ambient noise suppression can be implemented in the mobile phone. During a mobile phone call, the ambient noise suppressor operates upon an uplink signal that contains speech of the near-end user and that is transmitted by the mobile phone to the far-end user's device during the call, to clean up or reduce the amount of the background noise that has been picked up by the primary or speaker microphone of the mobile phone. There are various known techniques for implementing the ambient noise suppressor, for example, using a second microphone that is primarily used to pickup the ambient sound rather than the near-end user's speech and then electronically subtracting the ambient sound signal from the uplink signal.

SUMMARY

During a mobile phone call, when the mobile phone handset is held against the near-end user's ear, an ambient noise suppression algorithm should be running so as to clean up the uplink signal that is transmitted to the far-end user. This helps improve intelligibility for the far-end user when the near-end user is in a loud or noisy ambient or background environment. However, there are times when the near-end user would actually want the far-end user to clearly hear the background sounds. For instance, there may be a group of people singing in the background or there may be music playing in the background, which the near-end user would like the far-end user to hear and enjoy. The near-end user may be at a beach and would like the far-end user to hear the sound of the waves in the background. In such situations, the near-end user might move the phone off her ear and generally aim it at the source of the background sound. In accordance with an embodiment of the invention, a process running in the mobile device detects when the user has moved the phone off her ear during the call and in response automatically disables the ambient noise suppression. This allows the background sounds to be passed through in the uplink signal, allowing the far-end user to hear them more clearly. The phone will switch the noise suppression back on once it detects that the phone is back against the user's ear.

In accordance with another embodiment of the invention, a process in the communications device automatically detects, during a call, that the device has moved from an at-the-ear position to an away-from-the-ear position. Based on the detection, the process signals a noise suppressor that operates upon an uplink signal for the call, to change its noise suppression performance.

In a further embodiment of the invention, a mobile communications handset device includes multiple microphones, to produce multiple audio pick up signals. An uplink audio signal processor delivers an uplink audio signal to the radio, the uplink processor having a microphone beamformer whose input is coupled to receive the multiple audio pick up signals, and whose output provides the uplink signal. Decision logic automatically detects that a user has moved the device (a) from an at-the-ear position to an away-from-the-ear position or (b) vice versa, and signals the beamformer to enable either (a) far-field microphone beamforming or (b) omnidirectional microphone sensing, for the uplink signal.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

In accordance with an embodiment of the invention, an improved user experience is achieved when a decision process running in a mobile phone can detect when the near-end user has moved the phone off of her ear during a call, and in response automatically reduces the performance of, or may even disable, an ambient noise suppressor that is in the uplink audio signal processing path. This allows the background sounds to be passed through in the uplink signal, allowing the far-end user to more clearly hear the background sound as desired by the near-end user. This effect is more desirable when the uplink signal is processed by a wideband speech coder, as opposed to a more conventional narrowband coder. Wideband speech coding, such as AMR-WB, captures sound over a wider audible frequency spectrum and therefore allows music to be transmitted at greater fidelity (albeit at the expense of higher network bandwidth). The decision process may also be configured to automatically switch the ambient noise suppressor back on (or increase the performance of the ambient noise suppressor), once it detects that the phone is back against the user's ear.

Figure 1:
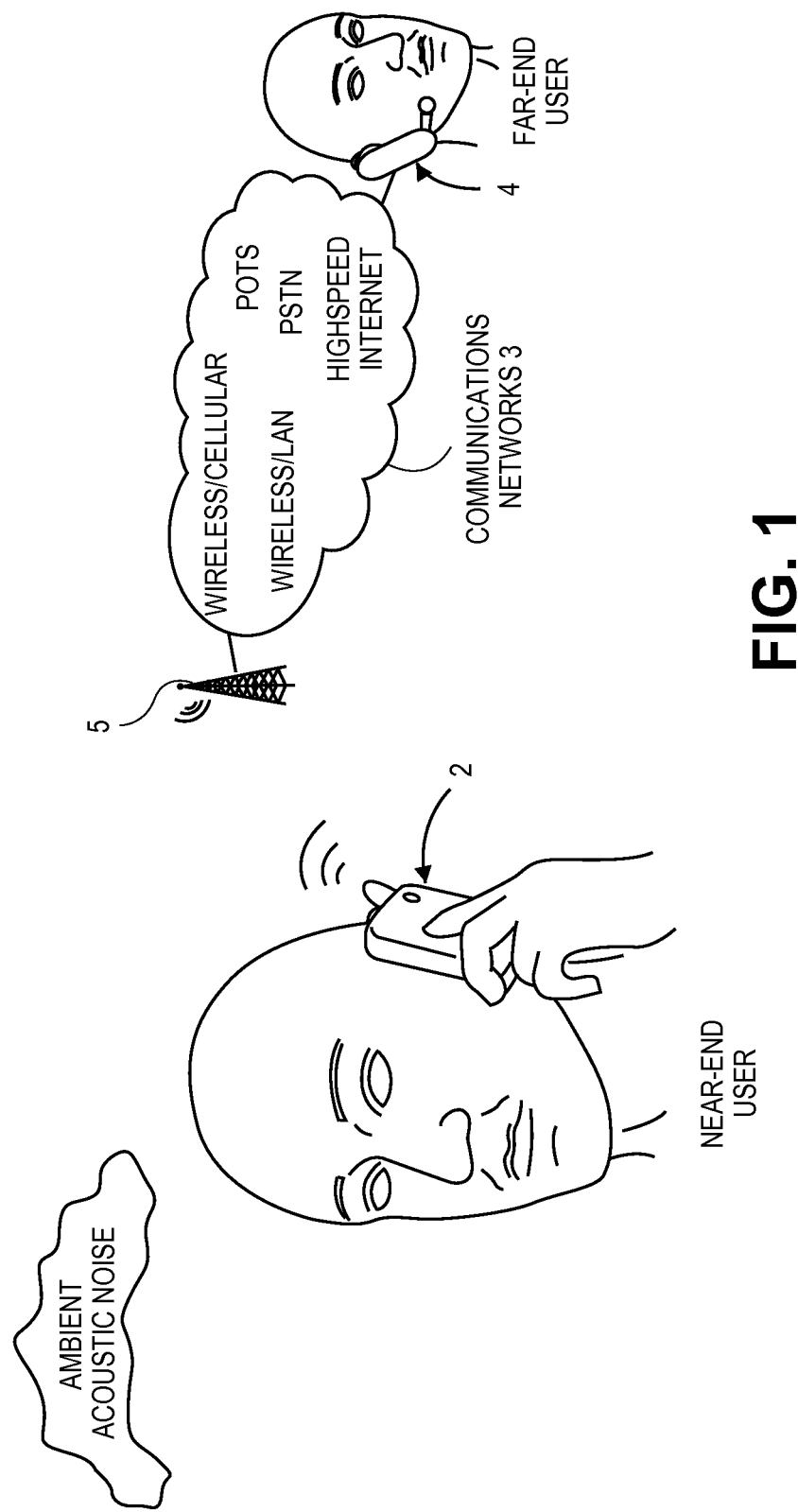
FIG. 1 depicts a mobile communications handset device in use at-the-ear during a call, by a near-end user in the presence of ambient acoustic noise.

FIG. 1 shows a near-end user holding a mobile communications handset device 2 such as a smart phone or a multi-function cellular phone, in an against-the-ear position. The near-end user is in the process of a call with a far-end user who is using a communications device 4. The terms "call" and "telephony" are used here generically to refer to any two-way real-time or live audio communications session with a far-end user (including a video call which allows simultaneous audio). The term "mobile phone" is used generically here to refer to various types of mobile communications handset devices (e.g., a cellular phone, a portable wireless voice over IP device, and a smart phone). The mobile device 2 communicates with a wireless base station 5 in the initial segment of its communication link. The call, however, may be conducted through multiple segments over one or more communication networks 3, e.g. a wireless cellular network, a wireless local area network, a wide area network such as the Internet, and a public switch telephone network such as the plain old telephone system (POTS). The far-end user need not be using a mobile device, but instead may be using a landline based POTS or Internet telephony station.

Figure 2:
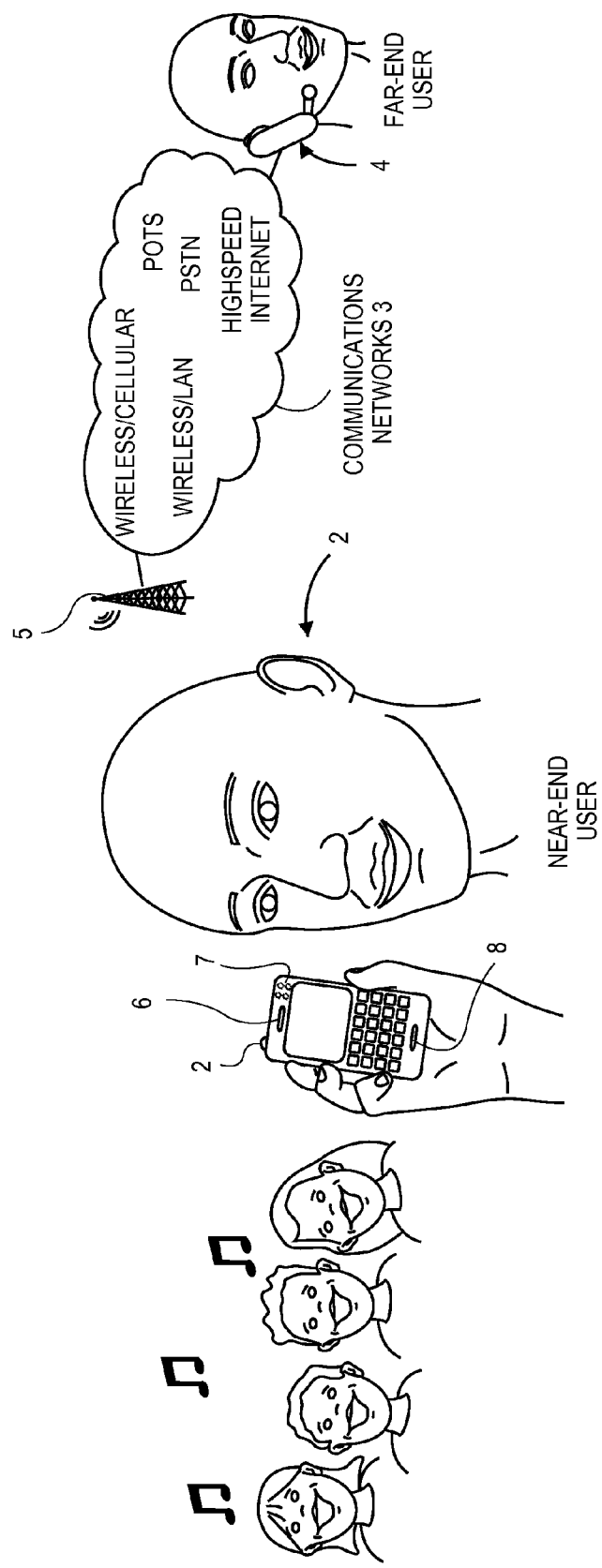
FIG. 2 depicts the user holding the mobile device away-from-the-ear and aimed towards an ambient sound source during a call.

As depicted in FIG. 1, the near-end user is holding the device 2 against his ear in what is referred to as an at-the-ear or close talk mode of operation. This is when an earpiece speaker or receiver 6 of the device 2 is pushed against the user's ear so as to block off any ambient acoustic noise. In contrast, FIG. 2 illustrates the situation where the near-end user is holding the device 2 in an away-from-the-ear position, also referred to as a far talk mode of operation. This reflects the situation, during a call, where the near-end user wants the far-end user to better hear the background or ambient sound that is local to the near-end user (in this case, the sound of several people singing in the background).

The mobile device 2 has an exterior housing in which are integrated an earpiece speaker 6 near one side of the housing, and a primary microphone 8 (also referred to as the speaker microphone) that is positioned near an opposite side of the housing. The mobile device 2 may also have a secondary microphone 7 located on a side or rear face of the housing and generally aimed in a different direction than the primary microphone 8, so as to better pickup the ambient sounds. The latter may be used by an ambient noise suppressor (see FIG. 3), to reduce the level of ambient acoustic noise that has been picked up inadvertently by the primary microphone 8 and that would otherwise be accompanying the near-end user's speech in the uplink signal that is transmitted to the far-end user. As explained below, when the near-end user is holding the device in the away-from-the-ear position, a process in the mobile device 2 automatically detects this condition during the call, and in response reduces the amount of ambient noise suppression that is performed upon the uplink signal. This enables the amount of background or ambient sound in the uplink signal to be greater when the device is held in the away-from-the-ear position than in the at-the-ear position.

Figure 3:
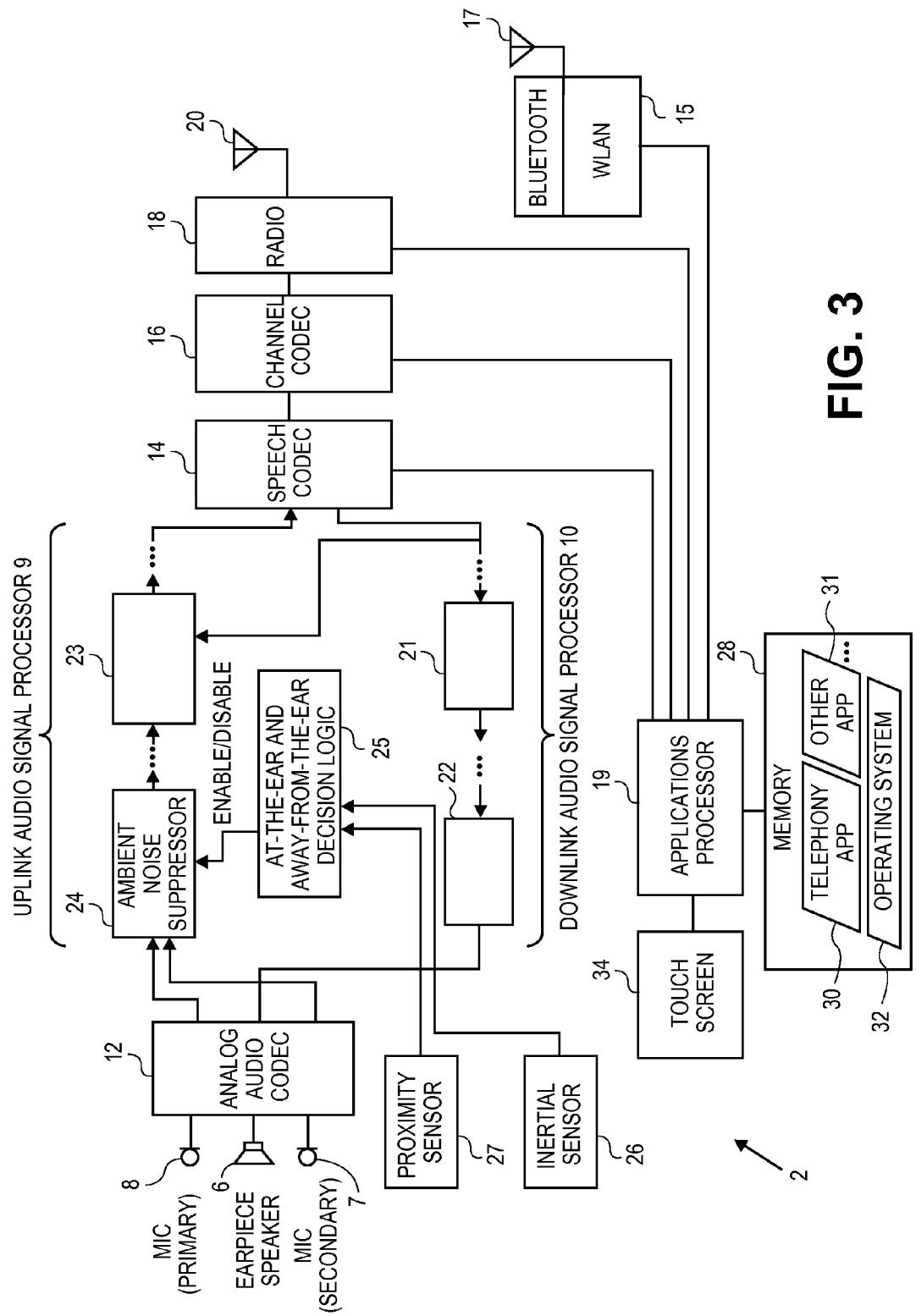
FIG. 3 is a block diagram of some of the functional unit blocks and hardware components in an example mobile device.

Turning now to FIG. 3, a block diagram of some of the functional unit blocks of the mobile device 2, relevant to the call enhancement process described above concerning ambient noise suppression, is shown. These include constituent hardware components such as those, for instance, of an iPhone™ device by Apple Inc. Although not shown, the device 2 has a housing in which the primary mechanism for visual and tactile interaction with its user is a touch sensitive display screen (touch screen 34). As an alternative, a physical keyboard may be provided together with a display-only screen. The housing may be essentially a solid volume, often referred to as a candy bar or chocolate bar type, as in the iPhone™ device. Alternatively, a moveable, multi-piece housing such as a clamshell design or one with a sliding physical keyboard may be provided. The touch screen 34 displays typical user-level functions of visual voicemail, a web browser, email, and digital camera viewfinder, as well as telephone features such as a virtual telephone number keypad that receives input from the user via touch gestures.

The user-level functions of the mobile device 2 are implemented under the control of an applications processor 19 that is programmed in accordance with instructions (code and data) stored in memory 28 (e.g., microelectronic non-volatile random access memory). The terms "processor" and "memory" are generically used here to refer to any suitable combination of programmable data processing components and data storage that can implement the operations needed for the various functions of the device described here. An operating system 32 may be stored in the memory 28, with several application programs, such as a telephony application 30 as well as other applications 31, each to perform a specific function of the device when the application is being run or executed. The telephony application 30, for instance, when it has been launched, unsuspended or brought to the foreground, enables a near-end user of the device 2 to "dial" a telephone number or address of a communications device 4 of the far-end user (see FIG. 1), to initiate a call, and then to "hang up" the call when finished.

For wireless telephony, several options are available in the device 2 as depicted in FIG. 3. A cellular phone protocol may be implemented using a cellular radio 18 that transmits and receives to and from a base station 5 using an antenna 20 integrated in the device 2. As an alternative, the device 2 offers the capability of conducting a wireless call over a wireless local area network (WLAN) connection, using the Bluetooth/WLAN radio transceiver 15 and its associated antenna 17. The latter combination provides the added convenience of an optional wireless Bluetooth headset link. Packetizing of the uplink signal, and depacketizing of the downlink signal, for a WLAN protocol may be performed by the applications processor 19.

The uplink and downlink signals for a call that is conducted using the cellular radio 18 can be processed by a channel codec 16 and a speech codec 14 as shown. The speech codec 14 performs speech coding and decoding in order to achieve compression of an audio signal, to make more efficient use of the limited bandwidth of typical cellular networks. Examples of speech coding include half-rate (HR), full-rate (FR), enhanced full-rate (EFR), and adaptive multi-rate wideband (AMR-WB). The latter is an example of a wideband speech coding protocol that transmits at a higher bit rate than the others, and allows not just speech but also music to be transmitted at greater fidelity due to its use of a wider audio frequency bandwidth. Channel coding and decoding performed by the channel codec 16 further helps reduce the information rate through the cellular network, as well as increase reliability in the event of errors that may be introduced while the call is passing through the network (e.g., cyclic encoding as used with convolutional encoding, and channel coding as implemented in a code division multiple access, CDMA, protocol). The functions of the speech codec 14 and the channel codec 16 may be implemented in a separate integrated circuit chip, some times referred to as a baseband processor chip. It should be noted that while the speech codec 14 and channel codec 16 are illustrated as separate boxes, with respect to the applications processor 19, one or both of these coding functions may be performed by the applications processor 19 provided that the latter has sufficient performance capability to do so.

The applications processor 19, while running the telephony application program 30, may conduct the call by enabling the transfer of uplink and downlink digital audio signals (also referred to here as voice or speech signals) between itself or the baseband processor on the network side, and any user-selected combination of acoustic transducers on the acoustic side. The downlink signal carries speech of the far-end user during the call, while the uplink signal contains speech of the near-end user that has been picked up by the primary microphone 8. The acoustic transducers include an earpiece speaker 6 (also referred to as a receiver), a loud speaker or speaker phone (not shown), and one or more microphones including the primary microphone 8 that is intended to pick up the near-end user's speech primarily, and a secondary microphone 7 that is primarily intended to pick up the ambient or background sound. The analog-digital conversion interface between these acoustic transducers and the digital downlink and uplink signals is accomplished by an analog audio codec 12. The latter may also provide coding and decoding functions for preparing any data that may need to be transmitted out of the mobile device 2 through a connector (not shown), as well as data that is received into the device 2 through that connector. The latter may be a conventional docking connector that is used to perform a docking function that synchronizes the user's personal data stored in the memory 28 with the user's personal data stored in the memory of an external computing system such as a desktop or laptop computer.

Still referring to FIG. 3, an audio signal processor is provided to perform a number of signal enhancement and noise reduction operations upon the digital audio uplink and downlink signals, to improve the experience of both near-end and far-end users during a call. This processor may be viewed as an uplink processor 9 and a downlink processor 10, although these may be within the same integrated circuit die or package. Again, as an alternative, if the applications processor 19 is sufficiently capable of performing such functions, the uplink and downlink audio signal processors 9, 10 may be implemented by suitably programming the applications processor 19. Various types of audio processing functions may be implemented in the downlink and uplink signal paths of the processors 9, 10.

The downlink signal path receives a downlink digital signal from either the baseband processor (and speech codec 14 in particular) in the case of a cellular network call, or the applications processor 19 in the case of a WLAN/VOIP call. The signal is buffered and is then subjected to various functions, which are also referred to here as a chain or sequence of functions. These functions are implemented by downlink processing blocks or audio signal processors 21, 22 that may include, one or more of the following which operate upon the downlink audio data stream or sequence: a noise suppressor, a voice equalizer, an automatic gain control unit, a compressor or limiter, and a side tone mixer.

The uplink signal path of the audio signal processor 9 passes through a chain of several processors that may include an acoustic echo canceller 23, an automatic gain control block, an equalizer, a compander or expander, and an ambient noise suppressor 24. The latter is to reduce the amount of background or ambient sound that is in the uplink signal coming from the primary microphone 8, using, for instance, the ambient sound signal picked up by the secondary microphone 7. Examples of ambient noise suppression algorithms are the spectral subtraction (frequency domain) technique where the frequency spectrum of the uplink audio signal from the primary microphone 8 is analyzed to detect and then suppress what appear to be noise components, and the two microphone algorithm (referring to at least two microphones being used to detect a sound pressure difference between the microphones and infer that such is produced by noise rather than speech of the near-end user).

The ambient noise suppressor 24 may be enabled and disabled by decision logic 25. The latter detects when the near-end user has moved the mobile device 2 from an at-the-ear position to an away-from-the-ear position during a call, and on that basis decides that less ambient noise suppression should be preformed and accordingly signals the ambient noise suppressor 24 to reduce its performance level of suppression, e.g. disables the noise suppressor 24 entirely. The decision logic 25 may also detect that the mobile device 2 has been moved back to the at the ear position during the call, and in response signals the ambient noise suppressor 24 to increase its performance level of ambient noise suppression (e.g., enables the otherwise disabled ambient noise suppressor 24).

In one instance, the ambient noise suppressor 24 may have at least two different or alternate modes of operation that are under control of the decision logic 25. In one mode (referred to as lesser ambient noise suppression mode or far talk mode) it passes both speech and music through the uplink signal path, whereas in another mode (referred to as greater ambient noise suppression mode or close talk mode) it is optimized to pass speech but not music.

The decision logic 25 may detect the different positions of the mobile device 2 by reading a proximity sensor 27 that is integrated in the mobile device 2, to determine whether or not a region near the earpiece speaker 6 of the device 2 is positioned next to an external object. The proximity sensor 27 may be located near the earpiece speaker 6 and aimed out of the front face of the housing of the device 2, as in a conventional iPhone™ device by Apple Inc. The proximity sensor 27 may use any one of several techniques for detecting the presence of or proximity to an external object, e.g. reflection analysis of infrared, optical, or sonar waves. As an alternative or in conjunction with the use of the proximity sensor 27, the decision logic 25 may inform its detection of the different positions of the device by reading an inertial sensor 26 that is also integrated in the device 2. Examples of the inertial sensor 26 include a position, orientation or movement sensor such as an accelerometer or a rate gyro. The inertial sensor 26 allows the decision logic 25 to determine whether or not a detected movement pattern of the device 2 indicates that the user has moved the device, for instance, away from her ear. Yet another technique that may be used, either by itself or in conjunction with the proximity sensor and the inertial sensor, is to detect changes in the acoustic load that is present against the earpiece speaker 6, e.g. using a further microphone positioned next to the earpiece speaker 6 to detect the sound pressure level at the output of the earpiece speaker 6.

In another embodiment, an audio beam former is provided at the beginning of the uplink signal path, to operate upon input received from at least two microphones (also referred to as a microphone array.) For instance, the array may include the primary microphone 8 and at least one secondary microphone 7. In one embodiment, the beamformer replaces the ambient suppressor 24. In another embodiment, the beamformer is inserted in front of the ambient noise suppressor 24 so that the latter will operate on the uplink signal that is produced by the beamformer. The beamformer analyzes the audio signals picked up by the microphone array (using known audio beam forming techniques), to derive the uplink audio signal (which then makes its way through the stages of the uplink audio processor 9 and eventually reaches the speech code 14.) When the beam former is configured into its far-field beamforming mode, the uplink signal that is delivered to the speech codec 14 is intended to faithfully include the background sound, rather than any speech of the near-end user. (This works provided that the background sound can be detected as an audio beam in a particular direction.) The decision logic 25 would configure the beam former to operate in this mode in response to detecting that the mobile device 2 has been moved from an at-the-ear position to an away-from-the-ear position.

When the user moves the mobile device 2 back to her ear, the decision logic 25 would detect such condition and in response may disable far-field beam forming thereby causing the beam former to operate in an omni-directional microphone sensing mode. The latter will more faithfully pick up the near-end user's speech in the acoustic near-field where large pressure variations occur (e.g., by ignoring any input from secondary microphones in favor of just the primary microphone 8). Again, it should be noted that the decision logic 25 would switch between the omni-directional and beam forming modes of operation automatically, in response to detecting whether the mobile device 2 is positioned at-the-ear or away-from-the-ear (based on signals available from, for instance, the proximity sensor 27, inertial sensor 26, and/or a microphone or other acoustic transducer that can detect the acoustic load currently presented to the earpiece speaker 6).

Figure 4:
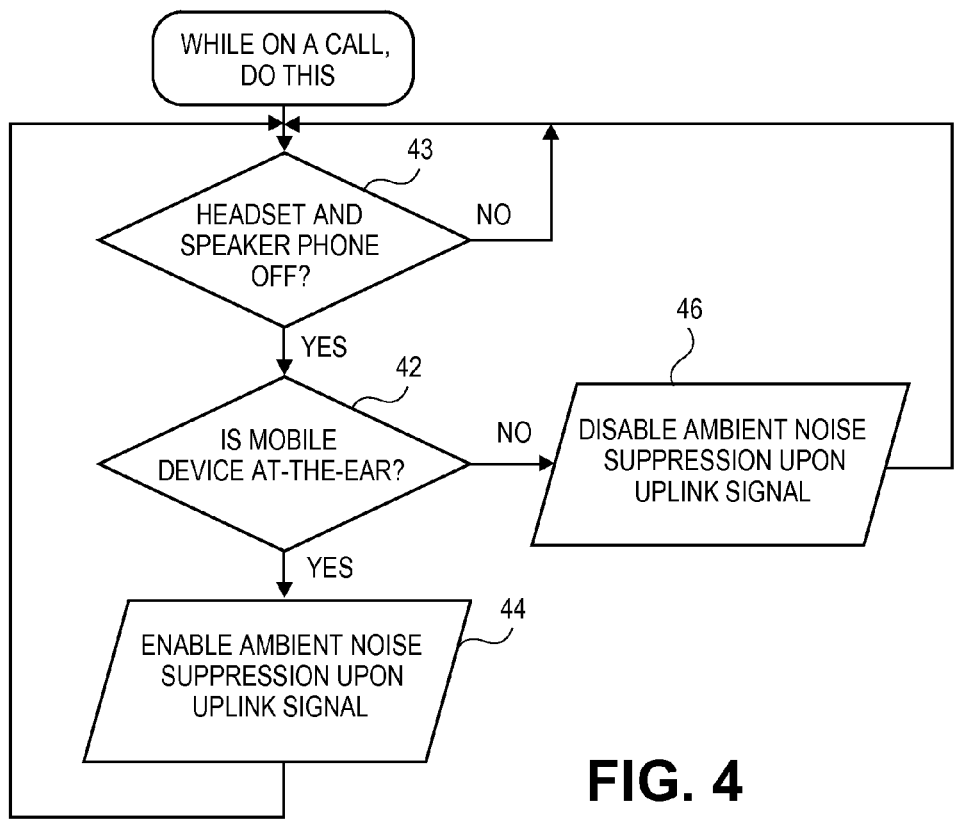
FIG. 4 is a flow diagram of a process or algorithm for making decisions on ambient nose suppression in the mobile device.

Turning now to FIG. 4, a flow diagram of a process or algorithm for making automatic decisions on uplink signal ambient noise suppression in the mobile device is shown. While the user is on a call using the device, a data processing component in the device makes a decision whether a headset is connected to the device, or a speakerphone is turned on (block 43). If either is true, then the process waits until the speakerphone is turned off or the headset has been disconnected.

When speakerphone is off and headset is disconnected, if the mobile device is detected to be at-the-ear (block 42), then an ambient noise suppressor is enabled or is allowed to remain enabled (block 44) to operate upon the uplink signal so as to provide clean speech of the near-end user in the uplink signal. Note that this ambient noise suppressor is designed to operate while the device is being used in close-talk mode, i.e., while the downlink signal is directed to the earpiece speaker or receiver (rather than the speakerphone or headset) and the earpiece speaker is being held close to the user's ear at the same time.

When speakerphone is off and headset is disconnected, if the mobile device is detected to not be at-the-ear but rather away-from-the-ear (block 42), then the ambient noise suppressor is disabled to allow the ambient sound to pass through in the uplink signal (block 46). An Automatic Gain Control (AGC) feature may also be enabled to adjust the ambient sound to a predetermined level. The above-described process repeats while the call continues.

Figure 5:
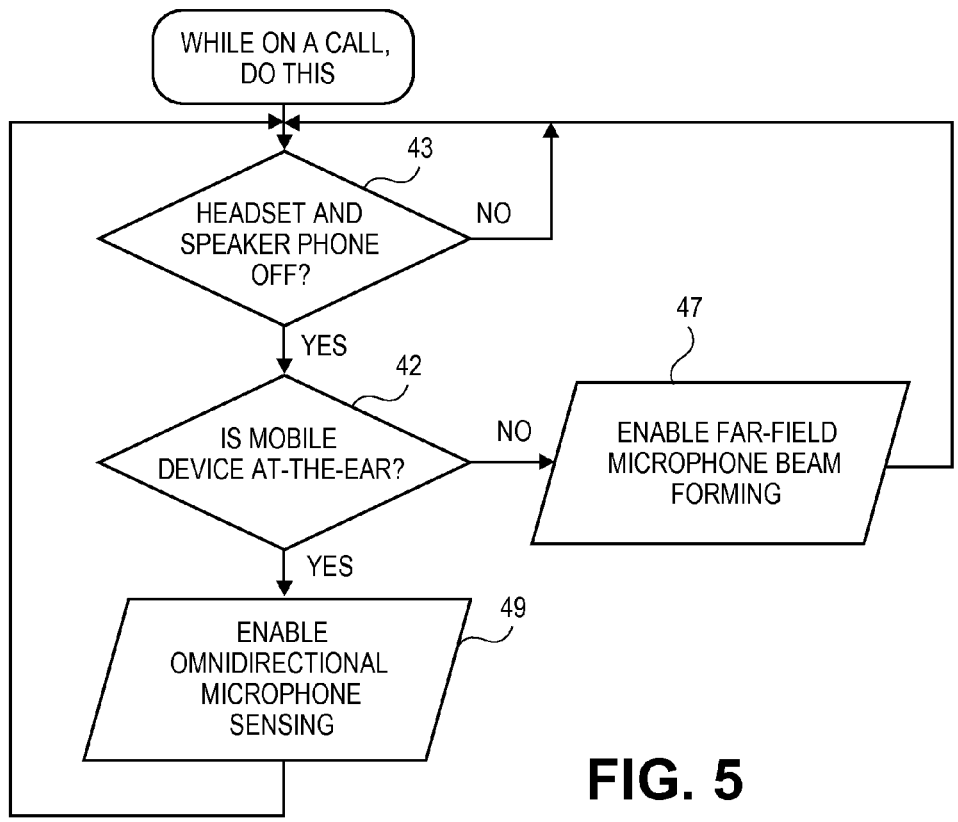
FIG. 5 is a flow diagram of a process or algorithm for making decisions on microphone array sensing in the mobile device.

FIG. 5 is a flow diagram of another process or algorithm in a near-end user's mobile handset device, which may improve the far-end user's experience during a call. This process may replace the one described in FIG. 4, or it may run in conjunction with it. The process here is for making decisions on how to use a microphone array in the mobile device so as to improve the quality of the near-end user's ambient sound (as it is heard by the far-end user). As in the process of FIG. 4, while the user is on a call, a data processing component in the device makes a decision whether a headset is connected to the device, or a speakerphone is turned on (block 43). If either is true, then the process waits until the speakerphone is turned off or the headset has been disconnected.

Still referring to FIG. 5, when speakerphone is off and headset is disconnected, if the mobile device is detected to be at-the-ear (block 42), then omnidirectional microphone sensing is enabled or is allowed to remain enabled (block 49) to produce the uplink signal. The latter in this case will contain clean speech of the near-end user (considered to be in the "near field") rather than the far-field or ambient sound. Note that the omnidirectional microphone sensing is designed to operate while the device is being used in close-talk mode, i.e., while the downlink signal is directed to the earpiece speaker or receiver (rather than the speakerphone or headset) and the earpiece speaker is being held close to the user's ear at the same time.

When speakerphone is off and headset is disconnected, if the mobile device is detected to not be at-the-ear but rather away-from-the-ear (block 42), then far-field microphone beam forming is enabled (block 47), to focus on the far-field or ambient sound rather than any near field sources. This allows the ambient sound to pass through in the uplink signal. The above-described process repeats while the call continues.

As explained above, an embodiment of the invention may be a machine-readable medium (such as microelectronic memory) having stored thereon instructions, which program one or more data processing components (generically referred to here as a "processor") to perform one or more of the digital signal processing operations described above, including ambient noise suppression and microphone beam forming, filtering, mixing, adding, inversion, comparisons, signal strength measurement and decision making. In other embodiments, some of these operations might be performed by specific hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the ambient noise suppression described above is to be performed in the digital (discrete time) domain, an alternative is to perform such far-field noise suppression in analog circuitry. The description is thus to be regarded as illustrative instead of limiting.

What is claimed is:

1. A method in a mobile communications handset device, comprising:
performing ambient noise suppression upon an uplink signal that contains speech of a near-end user of the device, wherein the uplink signal is transmitted to a far-end user during a call and the ambient noise suppression is to reduce amount of background or ambient sound that is also in the uplink signal;

detecting that the near-end user has moved the device from an at-the-ear position to an away-from-the-ear position during the call; and in response to said detection, performing less ambient noise suppression upon the uplink signal so that amount of background or ambient sound in the uplink signal is greater when the device is held in the away-from-the-ear position than in the at-the-ear position.

2. The method of claim 1 wherein performing less ambient noise suppression comprises disabling an ambient noise suppression process that is being performed upon the uplink signal.

3. The method of claim 1 further comprising:

detecting that the near-end user has moved the device to an at-the-ear position during the call and, in response, performing more ambient noise suppression upon the uplink signal.

4. The method of claim 3 wherein performing less ambient noise suppression comprises disabling an ambient noise suppression algorithm being performed upon the uplink signal, and wherein performing more ambient noise suppression comprises enabling said ambient noise suppression algorithm.

5. The method of claim 3 wherein performing less ambient noise suppression comprises configuring an uplink audio signal processor to pass speech and music, and wherein performing more ambient noise suppression comprises configuring the uplink audio signal processor to pass speech and not music.

6. The method of claim 1 wherein detecting that the near-end user has moved the device to an away-from-the-ear position comprises reading a proximity sensor in the device to determine whether or not a region near an earpiece speaker or receiver of the device is positioned next to an external object.

7. The method of claim 1 wherein detecting that the near-end user has moved the device to an away-from-the-ear position comprises reading an inertial sensor in the device to determine whether or not a detected movement pattern of the device indicates that the near-end user has moved the device away from her ear.

8. A method in a communications device, comprising:

detecting automatically, during a call, that the device has moved from an at-the-ear position to an away-from-the-ear position; and based on the detection, signaling a noise suppressor that operates upon an uplink signal for the call, to change its noise suppression performance.

9. The method of claim 8 wherein signaling a noise suppressor comprises signaling the noise suppressor to reduce amount of ambient noise suppression so that an ambient or background sound becomes louder to a far-end user during the call.

10. The method of claim 9 wherein detecting automatically comprises reading a proximity sensor in the device to determine whether or not a region near an earpiece speaker of the device is positioned next to an external object.

11. A mobile communications handset device comprising:
a proximity sensor;
a radio;
an uplink audio signal processor to deliver an uplink audio signal to the radio, the uplink processor having an ambient noise suppressor;
a downlink audio signal processor to receive a downlink audio signal from the radio; and
decision logic coupled to the proximity sensor to automatically detect that a user has moved the device from an at-the-ear position to an away-from-the-ear position by evaluating an output signal of the proximity sensor, and in response signal the ambient noise suppressor to reduce its noise suppression performance.

12. The device of claim 11 wherein the decision logic is to automatically detect that the user has moved the device back to the at-the-ear position, by evaluating the output signal of the proximity sensor, and in response signal the ambient noise suppressor to raise its noise suppression performance.

13. The device of claim 11 wherein the decision logic is to determine that a headset and a speakerphone are turned off, before signaling the ambient noise suppressor.

14. The communications device of claim 11 further comprising a speech codec coupled between the radio and the uplink and downlink processors, wherein the speech code has an audio bandwidth that is in the range 300 Hz-7 kHz and an output bit rate greater than 10 kbps.

15. A mobile communications handset device comprising:
a radio;
a plurality of microphones to produce a plurality of audio pick up signals;
an uplink audio signal processor to deliver an uplink audio signal to the radio, the uplink processor having a microphone beamformer whose input is coupled to receive the plurality of audio pick up signals and whose output provides the uplink signal;
a downlink audio signal processor to receive a downlink audio signal from the radio; and
decision logic to automatically detect that a user has moved the device (a) from an at-the-ear position to an away-from-the-ear position and (b) vice versa, and to signal the beamformer to enable (a) far-field microphone beamforming and (b) omnidirectional microphone sensing, respectively.

16. The device of claim 15 further comprising:
a proximity sensor, the decision logic being coupled to evaluate an output signal of the proximity sensor for detecting the at-the-ear and away-from-the-ear positions of the device.

17. The device of claim 15 further comprising a speech codec coupled between the radio and the uplink and downlink processors, wherein the speech code has an audio bandwidth that is in the range 300 Hz-7 kHz and an output bit rate greater than 10 kbps.

* * * * *